Nov. 23, 1943.  C. A. BROWN  2,334,990
MIXING VALVE
Filed Aug. 14, 1941  2 Sheets-Sheet 1
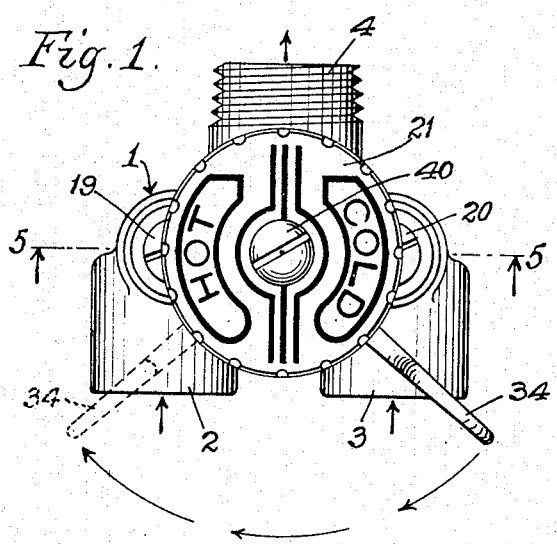
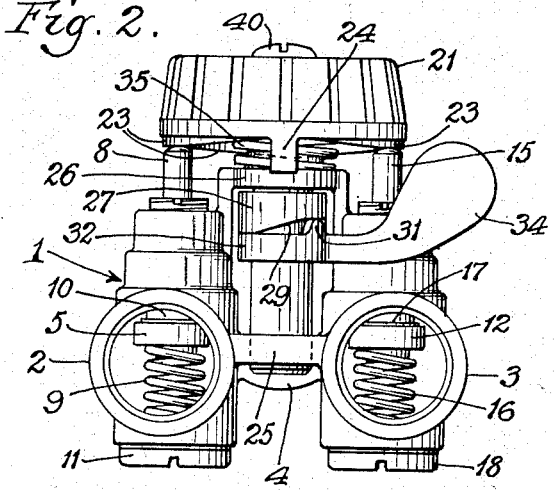
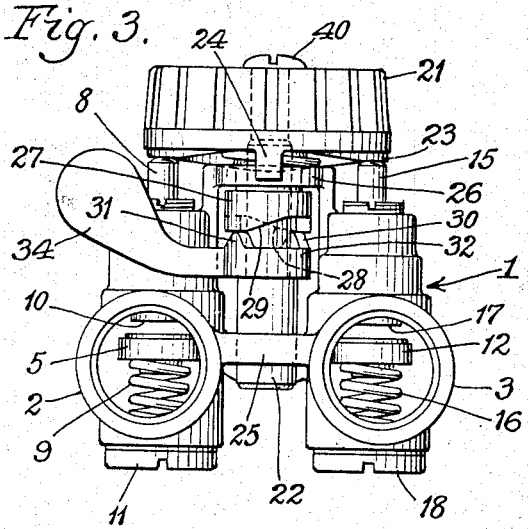
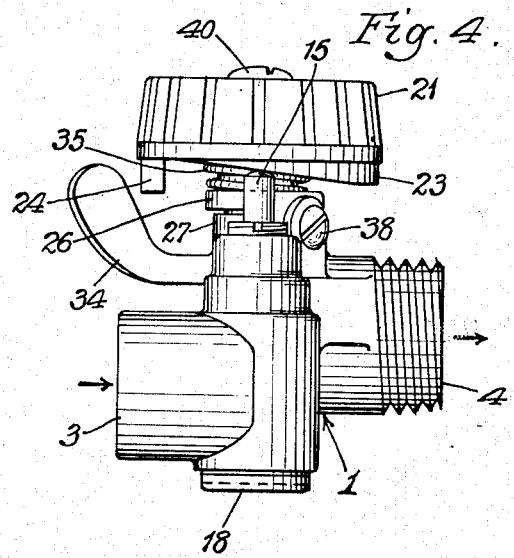
Inventor.
Clyde A. Brown.
by Parker & Carter
Attorneys.

Nov. 23, 1943.  C. A. BROWN  2,334,990
MIXING VALVE
Filed Aug. 14, 1941  2 Sheets-Sheet 2

Inventor.
Clyde A. Brown.
by Parker & Carter
Attorneys.

Patented Nov. 23, 1943

2,334,990

UNITED STATES PATENT OFFICE 2,334,990

MIXING VALVE

Clyde A. Brown, Chicago, Ill., assignor to The Dole Valve Company, Chicago, Ill., a corporation of Illinois Application August 14, 1941, Serial No. 406,745

3 Claims. (Cl. 277—18)

This invention relates to mixing valves and has for its object to provide a new and improved device of this description.

The invention has as a further object to provide a mixing valve particularly adapted to be used in connection with washing machines. In the usual washing machine the user utilizes a faucet where hot water and cold water are brought together and discharged from a single discharge, and attaches a hose to this discharge so as to discharge the water into the washing machine, and manipulates the cold and hot water faucets or valves until by testing with the hand, the water is of the proper temperature, and then fills the washing machine. At each washing the washing machine must be filled a number of times with water and the user must shut off the two faucets or valves each time the washing machine is filled and then manipulate them and test the water by means of the hand to again secure the right temperature. By means of the present invention the valve can be set to discharge through the hose, water of the proper temperature and remains set in this condition when the water is completely turned off, so that all the operator has to do is to turn off the water and turn it on again each time it is desired to put water in the washing machine, the water being discharged into the washing machine at the proper temperature.

The invention has other objects which are more particularly pointed out in the accompanying description.

Referring now to the drawings,

Fig. 1 is a plan view of one form of device embodying the invention;

Fig. 2 is a front elevation of the device shown in Fig. 1, with the control lever in closed position;

Fig. 3 is a view similar to Fig. 2, with the control lever in open position;

Fig. 4 is a side elevation of the device shown in Fig. 1;

Like numerals refer to like parts throughout the several figures.

Figure 5:
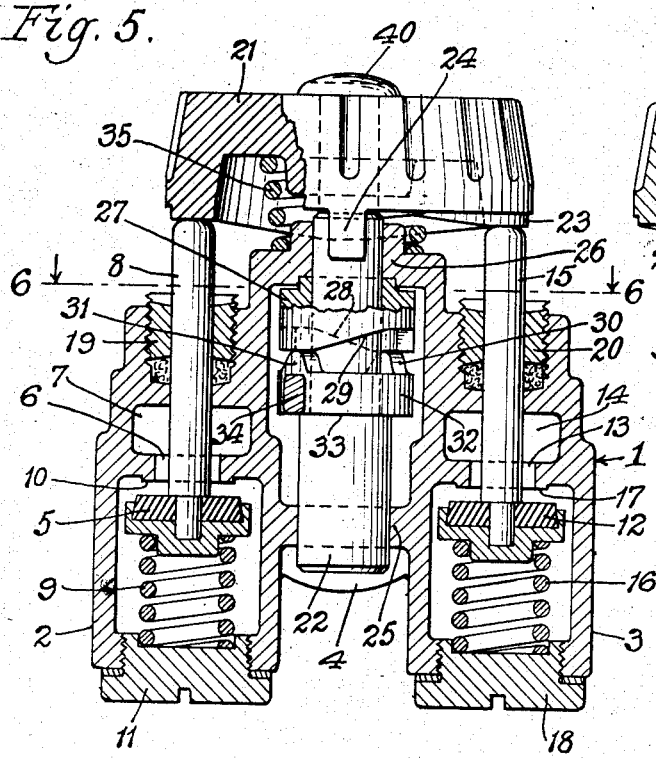
Fig. 5 is a sectional view taken on line 5—5 of Fig. 1.

Referring now to the drawings, the valve comprises a casing 1 having the inlets 2 and 3 for the hot and cold water and the outlet 4 for the mixed hot and cold water. The inlet 2 is provided with a valve 5 which controls the opening 6 through which the water passes into the chamber 7 and thence to the outlet 4. The valve 5 is connected with a stem 8 and is moved to its closed position by a spring 9, said valve seating on the seat 10. The spring 9 is held in place by the removable cap 11. The inlet 3 is provided with a valve 12 which controls the opening 13 through which the water passes into the chamber 14 and thence to the outlet 4. The valve 12 is connected with a stem 15 and is moved to its closed position by a spring 16, said valve seating on the seat 17. The spring 16 is held in place by the removable cap 18. The stems 8 and 15 are attached to the valves 5 and 12 and move said valves, and project up through the casing 1 and beyond the casing, as shown in Fig. 5, such stems passing through the stuffing boxes 19 and 20. When the valve stems 8 and 15 are free the springs 9 and 16 move the valves 5 and 12 to their closed positions.

These valves 5 and 12 are adjusted by an adjusting member 21 to vary the amount of opening of the valves so as to vary the proportion of hot and cold water delivered to the outlet 4. This adjusting member is rotatably mounted upon a central shaft 22 and is provided on its lower face with a cam 23. This adjusting member is provided with a stop 24 which projects beyond the cam 23 and which when the adjusting member is rotated in one direction, engages the valve stem 8 to stop its rotation in that direction, and when the adjusting member is rotated in the other direction, engages the valve stem 15 and stops the rotation of the adjusting member in that direction. The cam 23 is so arranged that when it is in contact with the valve stems 8 and 15 the rotation in one direction will cause one of the valves to be opened to a greater extent and the other valve to be opened to a lesser extent, to secure the desired relative proportion of hot and cold water to secure the proper mixture. In the particular construction shown, this cam 23 starts in proximity to the stop 24 and gradually increases in thickness to a point one hundred and eighty degrees from the stop and then gradually decreases in thickness to a point in proximity to the stop. When this cam is in engagement with the valve stem 8 and 15 it exerts a pressure on the valve stems opposing the springs 9 and 16, so as to move the valves 5 and 12 away from their seats 10 and 17 and to hold them in this moved position. The particular cam shown is arranged so that the two valves can be moved and held to secure the same opening or to be moved and held to secure any desired larger opening of one than the other. The cam can be rotated to a position so that one of the valves is fully closed while the other is fully open.

When the adjusting member 21 is in contact with the valve stems 8 and 15 and is adjusted so that the valves 5 and 12 are relatively open the proper amount to secure a mixture of water of the desired temperature, some means is provided for entirely shutting off both valves so as to stop the flow of water and yet maintain the same relative flow through the valves 5 and 12 when it is desired to secure the same temperature of the mixed hot and cold water. In order to secure this result there is provided means for moving the valves 5 and 12 to their closed positions independent of the adjusting member and without disturbing the relative adjustment of the valves when they are adjusted to secure any desired temperature of the mixed water. In the device shown there is provided a particular means for this purpose wherein the adjusting device 21 is moved away from the valve stems 8 and 15 so that the springs 9 and 16 move the valves to their closed positions to entirely shut off the water, and for moving the adjusting device 21 back into contact with the valve stems 8 and 15 to move the valves 5 and 12 to secure the same relative open position of the valves 5 and 12 which they occupied at the time the water was shut off.

Figure 7:
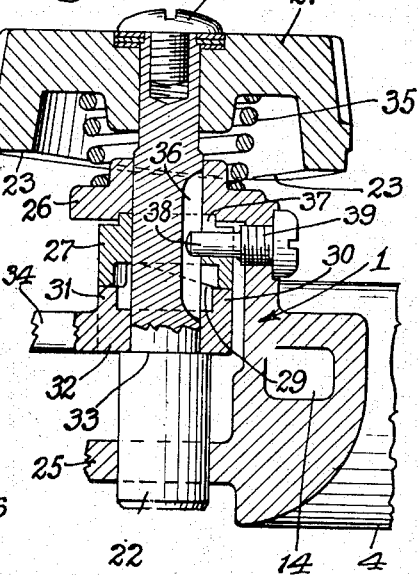
Fig. 7 is a sectional view taken on line 7—7 of Fig. 6.
Figure 6:
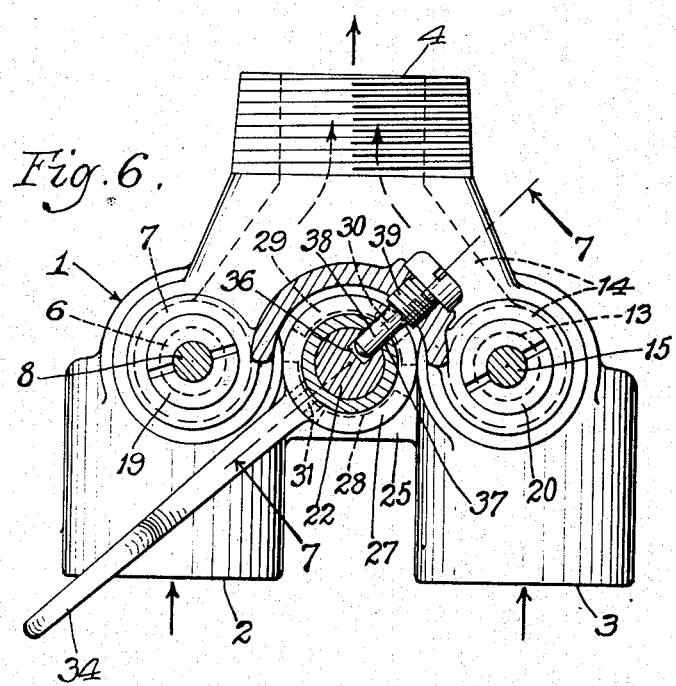
Fig. 6 is a sectional view taken on line 6—6 of Fig. 5, with the control lever in the same position shown in Fig. 3.
Figure 8:
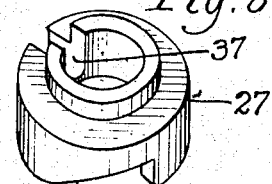
Fig. 8 is a perspective view of the fixed cam actuating the control lever to open the valves.
Figure 9:
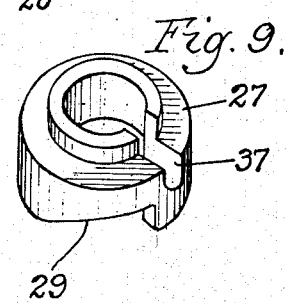
Fig. 9 is a view similar to Fig. 8 showing the cam turned 180 degrees from the position in Fig. 8.

To secure this result, as herein shown, the shaft 22 is movable longitudinally in the guides 25 and 26 in the casing 1. There is a cam member 27 which engages the casing 1 in proximity to the guide 26 and through which the shaft 22 moves to move the adjusting device 21. The cam member 27 has two cam faces 28 and 29 on opposite sides thereof and these cam faces are engaged by the cooperating cam engaging members 30 and 31 on the cam member 32 which is rotatably mounted upon the shaft 22 and which engages a shoulder 33 on the shaft to prevent its longitudinal movement therealong. Connected with the cam member 32 is a controlling handle or lever 34 by means of which the cam member 32 is given a partial rotation on the shaft 22. A spring 35 is located in a recess in the adjusting member 21 and engages such adjusting member and also engages the guide 26 of the casing 1. The shaft 22 has a groove 36 (Fig. 7) and the cam member 27 has a slot 37 (Figs. 7, 8 and 9) in alignment to receive the guide pin 38, which has the portion 39 provided with screw threads and threaded into the casing 1. This guide pin prevents rotation of the shaft and the cam member 27 but permits the shaft 22 to slide in its bearings 25 and 26 when the handle 34 and the member 32 are moved. The adjusting member 21 is rotatably secured to the shaft 22 by means of a screw 40, screw-threaded into the shaft and which has a head projecting beyond the shaft, extending out part way across the adjusting member 21. In the construction shown (Fig. 7), spacers are preferably arranged between the head of the screw 40 and the adjusting member 21 to permit adjustment to compensate for tolerance in assembly and to compensate for wear in service. The friction between the cam and the valve stems is sufficient to prevent the adjusting member 21 from moving when released.

When the handle 34 and the member 33 are moved in one direction, the members 30 and 31 engage the cam faces 28 and 29, riding from the low part of the cam faces to the high part so as to move the shaft 22 and the adjusting member 21 downwardly into contact with the valve stems 8 and 15 so as to move the valves 5 and 12 to their open positions (Fig. 5). When the handle 34 and the member 32 are moved in the other direction the members 30 and 31 ride on the cam faces from the low points to the high points and the spring 35 moves the shaft 22 and the adjusting member 21 upwardly so as to release the valve stems 8 and 15, whereupon the springs 9 and 16 move the valves 5 and 12 to their closed positions.

The use and operation of the invention are as follows:

When it is desired, for example, to use the mixing valve in connection with a washing machine or in any other connection where mixed hot and cold water is to be used, the hot and cold water inlets 2 and 3 are connected to the hot and cold water supply and the outlet 4 is connected with a pipe or hose which leads to the washing machine or any other desired point of use.

The handle 34 and member 32 are moved so that the members 30 and 31 ride up on the high points of the cam 27 so as to move the shaft 22 downwardly and move the adjusting member 21 into contact with the valve stems 8 and 15 to move them down and move the valves 5 and 12 to open positions. The adjusting member 21 is then rotated, the cam 23 engaging the valve stems 8 and 15. The rotation of the adjusting member 21 in one direction applies increasing pressure on one of the valve stems, say for example the valve stem 8, which moves the hot water inlet valve 5 to a more open position and releases the pressure on the valve stem 15 so that the spring 16 moves the cold water inlet valve 12 to a more closed position, thereby increasing the temperature of the water passing out of the outlet 4. If the water is too hot, the adjusting member 21 is moved in the opposite direction to increase the pressure on the valve stems 15 and open the cold water inlet valve 12 to a more open position and release the pressure on the valve stem 8 so that the spring 9 moves the hot water admission valve 5 to a more closed position thereby lowering the temperature of the water passing out of the outlet 4.

The temperature of the water is tested in any desired manner, as for example by the hand, by feeling it. The adjusting member 21 is thus moved back and forth to secure the relative open position of the two valves 5 and 12 which gives the desired temperature of the water passing out the outlet 4. The adjusting member 21 is then left in this position and when the desired amount of water is obtained in the washing machine or other device, the handle 34 is then moved so as to move the member 32 and cause the members 30 and 31 to ride from the high points to the low points of the cam faces of the cam member 27, whereupon the spring 35 lifts the shaft 22 and the adjusting member 21 so as to release the pressure on the valve stems 8 and 15, whereupon the springs 9 and 16 move the valves 5 and 12 to their closed positions to entirely shut off the flow of both the hot and cold water.

When it is desired to again use water of this same temperature, the handle 34 and the member 32 are moved to cause the members 30 and 31 to ride upon the high points of the cam faces of the cam 27 and cause the shaft 22 to be moved to bring the adjusting member 21 into contact with the valve stems 8 and 15 and move the valves 5 and 12 to their proper relative open positions.

It will, therefore, be seen that with this valve the valve can be set to provide water of the desired temperature and it can then be closed to shut off entirely the flow of water. Water of the same temperature can again be secured by simply moving the handle 34 to open the hot and cold water valves, it being unnecessary to again adjust the adjusting member 21 to secure the desired temperature of the mixed hot and cold water.

I claim:

1. A mixing valve comprising a casing provided with a hot water inlet and a cold water inlet, a separate valve for controlling each of said cold and hot water inlets, seats for said valves, springs for moving said valves into contact with said seats, an adjusting device for adjusting the cold and hot water valves to vary inversely the effective size of said cold and hot water inlet openings and means for closing and opening said cold and hot water valves without altering their adjusted relationship when open, said means comprising an adjusting member, valve stems connected with said valves, disconnected from said adjusting member but engaging it when the valves are open, and means for moving said adjusting member comprising a longitudinally movable member upon which said adjusting member is rotatably mounted two cooperating cams on said longitudinally movable member intermediate the ends thereof one fixed thereon and the other rotatably mounted thereon and a laterally projecting handle connected with said rotatable cam.

2. A mixing valve comprising a casing, provided with a cold water inlet, a hot water inlet and a mixed water outlet, a valve for controlling said hot water inlet, a valve stem connected therewith, a valve for controlling said cold water inlet, a valve stem connected therewith, an adjusting device for adjusting the cold and hot water valves to vary inversely the effective size of said cold and hot water openings, said adjusting device comprising a longitudinally movable member fixed against rotation and substantially parallel with said valve stems and an adjusting member rotatably mounted on the end of said longitudinally movable member a stop on said adjusting member having on its lower face a cam which starts in proximity of said stop and gradually increases in thickness to a point substantially one hundred and eighty degrees from the stop and then gradually decreases in thickness to a point in proximity to the stop and cooperating cams on said longitudinally movable member one fixed thereto and one rotatable thereon and a laterally extending handle connected with said cam rotatable on said longitudinally movable member by means of which said adjusting member is moved vertically to cause the cam on the adjusting member to be moved into or out of contact with said valve stems.

3. A mixing valve comprising a casing provided with a cold water inlet, a hot water inlet and a mixed water outlet, a valve for controlling said hot water inlet, a valve stem connected therewith, a valve for controlling said cold water inlet, a valve stem connected therewith, a longitudinally movable shaft intermediate said valve stems and fixed against rotation, an adjusting member on the exterior of the casing, rotatably mounted on said shaft and having a cam device which engages the ends of said valve stems, a cam member fixed to said shaft, a laterally projecting handle having an end piece rotatably surrounding said shaft intermediate its end, said end piece being provided with a cam which engages the cam fixed to said shaft, said handle when moved in one direction moving the cam members relatively so as to move the shaft longitudinally to move the adjusting member and valve stems and valves in one direction, and a spring for moving the shaft and adjusting member longitudinally in the other direction when the handle is moved to its initial position.

CLYDE A. BROWN.